US007777148B2

(12) United States Patent
Zimmermann

(10) Patent No.: US 7,777,148 B2
(45) Date of Patent: Aug. 17, 2010

(54) DEVICE FOR PRESORTING SEPARATED THIN POSTAL ITEMS

(75) Inventor: Armin Zimmermann, Konstanz (DE)

(73) Assignee: Siemens Aktiengesellschaft, Munich (DE)

( * ) Notice: Subject to any disclaimer, the term of this patent is extended or adjusted under 35 U.S.C. 154(b) by 410 days.

(21) Appl. No.: 11/791,099

(22) PCT Filed: Nov. 24, 2005

(86) PCT No.: PCT/EP2005/012601

§ 371 (c)(1),
(2), (4) Date: May 17, 2007

(87) PCT Pub. No.: WO2006/056454

PCT Pub. Date: Jun. 1, 2006

(65) Prior Publication Data

US 2008/0087582 A1 Apr. 17, 2008

(30) Foreign Application Priority Data

Nov. 24, 2005 (DE) ...................... 10 2004 056 696

(51) Int. Cl.
*G06K 9/00* (2006.01)

(52) U.S. Cl. ....................... 209/584; 209/583; 209/900; 209/596

(58) Field of Classification Search ................. 209/583, 209/584, 596, 900
See application file for complete search history.

(56) References Cited

U.S. PATENT DOCUMENTS 2,993,596 A * 7/1961 Steinbuch .................... 209/566
4,171,746 A * 10/1979 Talyzin et al. ............... 209/657
4,615,446 A * 10/1986 Pavie ......................... 209/583
4,711,357 A 12/1987 Langenbeck et al.
4,995,504 A 2/1991 Kühn
5,346,072 A * 9/1994 Dian et al. .................. 209/584

(Continued)

FOREIGN PATENT DOCUMENTS

DE 27 42 802 A1 4/1979

(Continued)

OTHER PUBLICATIONS

Derwent Abstract—DE 43 09 765 A1; Sep. 29, 1994; Siemens AG, D-80333 Muenchen, Germany.

(Continued)

*Primary Examiner*—Gene Crawford
*Assistant Examiner*—Terrell H Matthews
(74) *Attorney, Agent, or Firm*—Laurence A. Greenberg; Werner H. Stemer; Ralph E. Locher

(57) ABSTRACT

A device for presorting separated thin postal items to sorting final position areas of a postal item sorting machine according to the read distributing information and to the assigned sorting final position area includes at least two inputs for streams of postal items and at least two outputs each leading to a sorting final position area. All connecting paths with intersections are provided in a multiple manner between each respective input and each respective output. The postal items are distributed via corresponding switches to the multiple connecting paths from an input to an output in such a manner that, at the intersections, gaps develop that are required for postal items in the intersecting path and in the junctions.

7 Claims, 5 Drawing Sheets

U.S. PATENT DOCUMENTS

| | | | | |
|---|---|---|---|---|
| 5,577,596 | A | 11/1996 | Van Essen | |
| 6,366,828 | B1 * | 4/2002 | De Leo et al. | 700/228 |
| 6,953,906 | B2 * | 10/2005 | Burns et al. | 209/584 |
| 2006/0249438 | A1 | 11/2006 | Schwarzbauer et al. | |

FOREIGN PATENT DOCUMENTS

| | | | |
|---|---|---|---|
| DE | 43 09 765 | A1 | 9/1994 |
| DE | 19528829 | C2 | 4/1998 |
| EP | 0 613 730 | A2 | 9/1994 |
| EP | 0775657 | A2 | 5/1997 |
| FR | 2692565 | A1 | 12/1993 |
| GB | 921679 | A | 3/1963 |
| JP | 2000118805 | A | 4/2000 |

OTHER PUBLICATIONS

Derwent Abstract—DE 27 42 802 A1; Apr. 5, 1979; Standard Elektrik Lorenz AG, D-7000 Stuttgart, Germany.

* cited by examiner

DEVICE FOR PRESORTING SEPARATED THIN POSTAL ITEMS

BACKGROUND OF THE INVENTION

The invention relates to a device for presorting separated thin postal items, of which the distributing information has been successfully read, to sorting final position areas featuring sequentially arranged sorting final positions of a postal item sorting machine corresponding to the read distribution information and to the assigned sorting final position area, with a number of entries for the postal item streams and a number of exits leading to a sorting final position area in each case, with the entries being connected to the exits by connecting paths in each case.

To increase the throughput of sorting machines for flat postal items, although the transport speed cannot simply be increased and the spacings between the postal items (item gaps) in the stream of postal items cannot be reduced below a minimum spacing, handling the items in parallel offers an obvious solution. In such a case two material entries create two streams of postal items which are fed to two segments of the sorting machine which can each process the throughput of one material entry. A prerequisite for the parallelization is that each postal item of the two item streams can reach each destination address of the two segments of the sorting machine which for transport in one plane can be made possible by an intersection of the two postal item streams for example. In such cases the overall throughput is reduced since a correspondingly large gap must be created in one of the postal item streams if two postal items from the two postal item streams are intended for one segment at the same time. In addition the overall throughput is reduced, because, to avoid a collision in one of the postal item streams, a correspondingly large gap must be created if two postal items were to be located in the intersection area at the same time, which would each have be transported into the "other" segment of the sorting machine connected by the intersection.

To avoid these disadvantages an intersection-free transport of the postal items from one material entry in each case to the segment located beyond the other material entry in two transport planes is proposed.

In addition a connecting path is provided from one material entry to the segment beyond the other material entry which intersects with a connecting path from the other material entry to the segment arranged after the first material entry at an intersection (U.S. Pat. No. 4,615,446).

A sorting device is described in EP 0 613 730 A2 in which a number of connecting paths are possible from a specific entry to a specific exit. The connecting paths are formed by transport units located on turntables, arranged in a hexagonal grid structure, which are aligned in accordance with the entries and exits to be connected. In this case however only connecting paths which do not cross each other are ever active at a specific time, with the topology of the paths also being variable over time. Therefore there is also no merging of a number of path sections to a single path section in which collisions between postal items can occur. Because of the many controlled rotatable transport units required, this apparatus has a high level of mechanical complexity.

SUMMARY OF THE INVENTION

The object of the invention is to create a device for presorting separated postal items with a number of material entries, from which the postal items are able to be transported with little effort to each segment of the sorting machine in a transport plane over intersecting connecting paths.

In accordance with the invention the object is achieved by a device for presorting separated thin postal items to sorting final position areas of a postal item sorting machine according to the read distributing information and to the assigned sorting final position area having at least two inputs for streams of postal items and at least two outputs each leading to a sorting final position area. All connecting paths with intersections are provided in a multiple manner between each respective input and each respective output. The postal items are distributed via corresponding switches to the multiple connecting paths from an input to an output in such a manner that, at the intersections, gaps develop that are required for postal items in the intersecting path and in the junctions.

In this case the intersecting connecting paths of a defined topology feature intersections which are always passable in the intersecting directions. All connecting paths with intersections between one entry and one exit respectively are embodied as multiple paths and the postal items are distributed via the corresponding switches to the multiple connecting paths from an entry to an output in such a way that at the intersections, gaps develop that are required for postal items in the intersecting path and in the junctions.

The supplied postal item streams are divided up and joined again in each case with the "other" postal item streams one after the other, with the postal item streams passing through a number of intersections. The "empty spaces" arising in the postal item stream through the division can be occupied by the postal items of the parallel postal item stream, which means that an obstacle-free intersection area is produced.

Advantageous embodiments of the invention are set down in the subclaims.

So that the throughput loss is as low as possible, it is advantageous for the number of intersecting connecting paths from one entry to one exit in each case to correspond to at least the larger value of the number of the entries or of the exits.

It is also advantageous, for a device with two entries, for the postal item streams and two exits leading to a sorting final position area in each case, to connect each entry via two consecutive switches arranged in a connecting path to the downstream exit at the end of this connecting path and via the two switches by means of two further connecting paths and corresponding junctions with the connecting path from the other entry to its downstream exit, with the two further connecting paths leading from an entry to the exit downstream from the other entry in each case intersect with the two further connecting paths from the other entry. The postal items to be directed from one entry to the connecting path connecting the other entry with the downstream exit in each case are directed to create the gaps alternately into the two connecting paths following each other.

So that the gaps formed in the postal item streams are sufficient for all postal items in the range of postal items, it is advantageous, for the gaps of the front edges and rear edges of the postal items from each other to correspond to at least the length of the longest postal item plus the minimum gap and for the chronological sequence of the postal items in the item stream and the transport lengths to be selected so that the postal items from the two entries pass through the intersection areas without obstructing each other.

To adapt the gaps formed to the lengths of the postal items and thereby to increase the throughput in relation to the solution presented in the previous paragraph, it is advantageous if, to implement the intersections, first sections of the intersecting connecting paths coming from the switches in the connecting paths without intersections come out into a junction in each case and if in each case, in a link following the junction, a braking and acceleration module is arranged for controlled displacement of postal items in the postal items stream or for temporary storage of the postal items. A switch is then located at the end of the common link in each case to distribute the postal items to further parts of the intersecting connecting paths.

To reduce the length required for the presorting device with two entries and exits the second switches in the transport direction located in the connecting paths are advantageously arranged before the junctions in the relevant connecting paths with the first further connecting paths, so that the remaining sections of the first further connecting paths additionally intersect twice with the first sections of the second further connecting paths. A further braking and acceleration module is arranged in each connecting path between the two switches for collision-free joining and crossing of the postal item streams.

It is further advantageous, if each non-intersecting connecting path from an entry to an exit features one or more parallel subsections each with a braking and acceleration module for temporary storage of postal items for the case in which the respective postal item is to be directed at the same time as a postal item of another entry into the same exit. The buffered postal item is then forwarded, as soon as the exit involved is free.

BRIEF DESCRIPTION OF THE SEVERAL VIEWS OF THE DRAWINGS

The invention is explained below in an exemplary embodiment with reference to the drawing.

The figures show

DETAILED DESCRIPTION OF THE INVENTION

Figure 1:
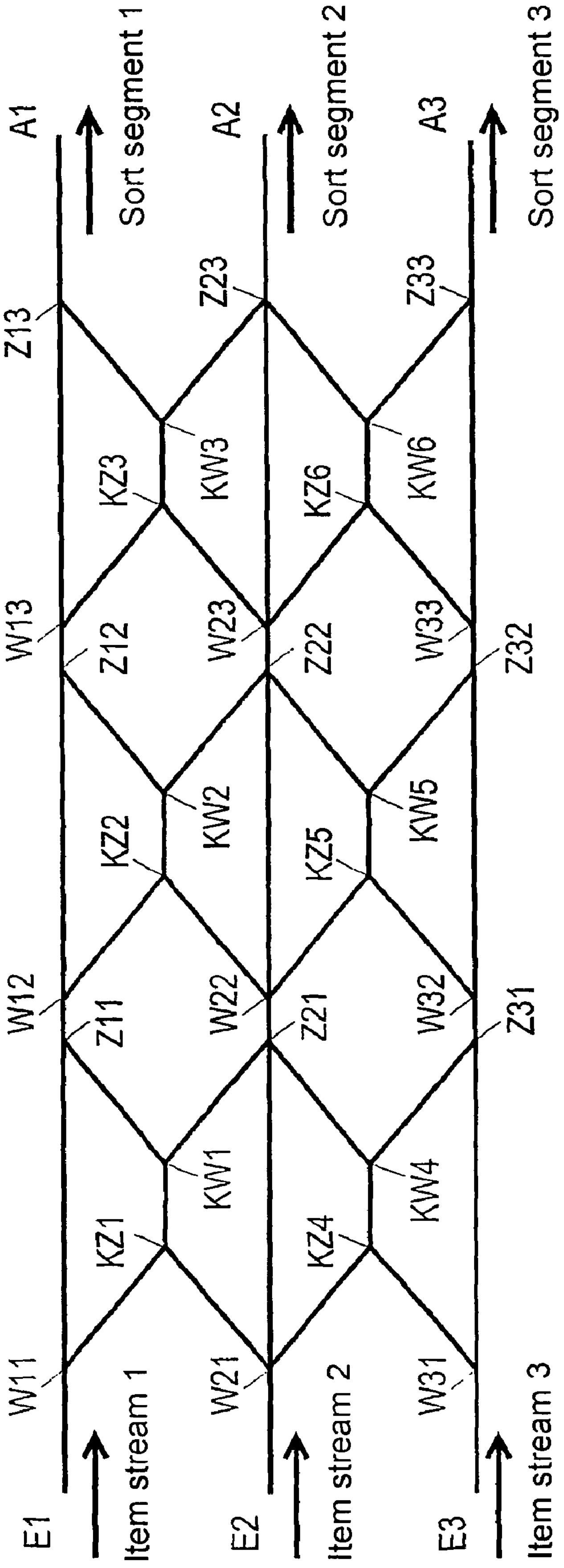
FIG. 1 a schematic diagram of a presorting device with 3 entries, 3 exits and a total of 6 intersections, FIG. 2 a schematic diagram of a presorting device with two entries and exits and two intersection areas displaced into each other, FIG. 3 a schematic diagram of a presorting device according to FIG. 2 with four additional braking and acceleration modules, FIG. 4 a schematic diagram of a presorting device according to FIG. 3 with two further braking and acceleration modules, FIG. 5 a schematic overhead view of an intersection.

The presorting device in FIG. 1 has three entries E1, E2, E3 and three exits A1, A2, A3. Entry E1 is connected via three switches W11, W12, W13 and three junctions Z11, Z12, Z13 to exit A1 for the sorting segment 1, entry E2 is connected via three switches W21, W22, W23 and three junctions Z21, Z22, Z23 to exit A2 for sorting segment 2 and entry E3 is likewise connected via three switches W31, W32, W33 and three junctions Z31, Z32, Z33 to exit A3 for sorting segment 3. The cross connections, i.e. those to direct postal items from entry E1 to exit A2 or A3, are implemented as follows:

The entries E1, E2, E3 are followed in the connecting path in each case by switches W11, W21, W31 which connect the postal items either in the direction of the directly following exit or to intersection junctions KZ1 and KZ4 between the connecting paths, which connect the entry E1 with the exit A1, the entry E2 with the exit A2 and the entry E3 with the exit A3. The switches W11 and W31 located in the outer connecting paths switch between two directions, whereas the switch W21 arranged in the central connecting path after the entry E2 is switchable in three directions, i.e. either to the left to intersection junction KZ1, straight ahead in the direction of exit A2 or to the right to intersection junction KZ4.

Such a three-directional switch can obviously also be implemented by two two-directional switches arranged after each other.

The two intersection junctions KZ1, KZ4 are each followed by an intersection switch KW1, KW4. Each intersection junction KZ1, KZ4 forms an intersection area together with the immediately following intersection switch KW1, KW4.

This enables postal items to be directed as required also from entry E1 via switch W11, intersection junction KZ1, intersection switch KW1 and junction Z21 to the connecting path between entry E2 and exit A2, or also accordingly from entry E2 to the connecting path between entry E1 and exit A1. In the same manner an intersection area is arranged between the connecting path from entry E2 to exit A2 and the connecting path from entry E3 to exit A3, consisting of the intersection junction KZ4 and an immediately following intersection switch KW4, with the exits of the intersection switch KW4 being connected to the connecting paths between entry E2 and exit A2 and between entry E3 and exit A3.

In this case postal items can also be transported from the entries E2 or E3 to the exits A3 or A2.

Following this described connecting path structure with intersection areas between the connecting paths from entry E1 to exit A1, from entry E2 to exit A2 and from entry E3 to exit A3 are arranged another two identical connection structures between the connecting paths from entry E1 to exit A1, from entry E2 to exit A2 and from entry E3 to exit A3.

Each structure likewise has two intersection areas, consisting in each case of an intersection junction KZ2, KZ5 as well as KZ3, KZ6 and an intersection switch KW2, KW5 as well as KW3, KW6, which are likewise routed via switches W12, W22, W32, W13, W23, W33 and intersections Z12, Z22, Z32, Z13, Z23, Z33 on the connecting paths from entry E1 to exit A1, from entry E2 to exit A2 and from entry E3 to exit A3. As can be easily seen, there is thus the option of implementing the intersecting connections of each entry at least twice with the corresponding exits, so that gaps are created for intersecting postal items in the intersecting areas and in the junctions and collisions are thereby avoided. The option is thus provided for example of transporting a postal item at entry E1 via the intersection areas KZ1-KW1 and KZ5-KW5 or KZ2-KW2 and KZ6-KW6 to exit A3 or transporting a postal item at entry E3 via the intersection areas KZ4-KW4 and KZ2-KW2 or KZ5-KW5 and KZ3-KW3 to exit A1. If the postal items are to be directed from an entry to an exit adjacent to the intersection-free following exit, then, as can be seen, there are even three possible intersecting paths.

Figure 2:
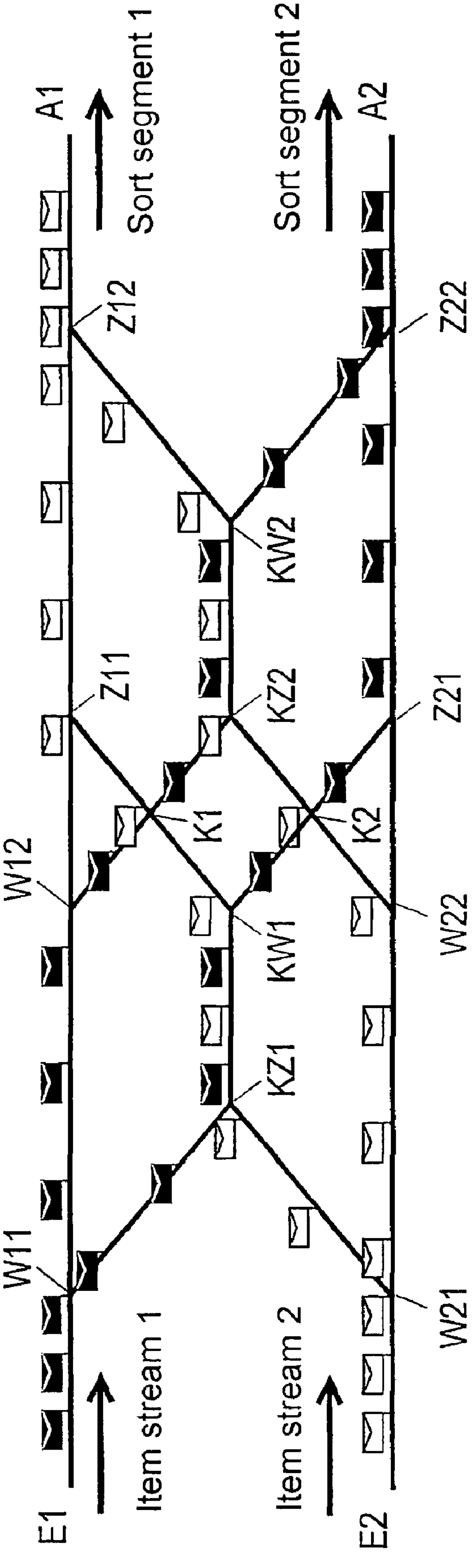
Figure 3:
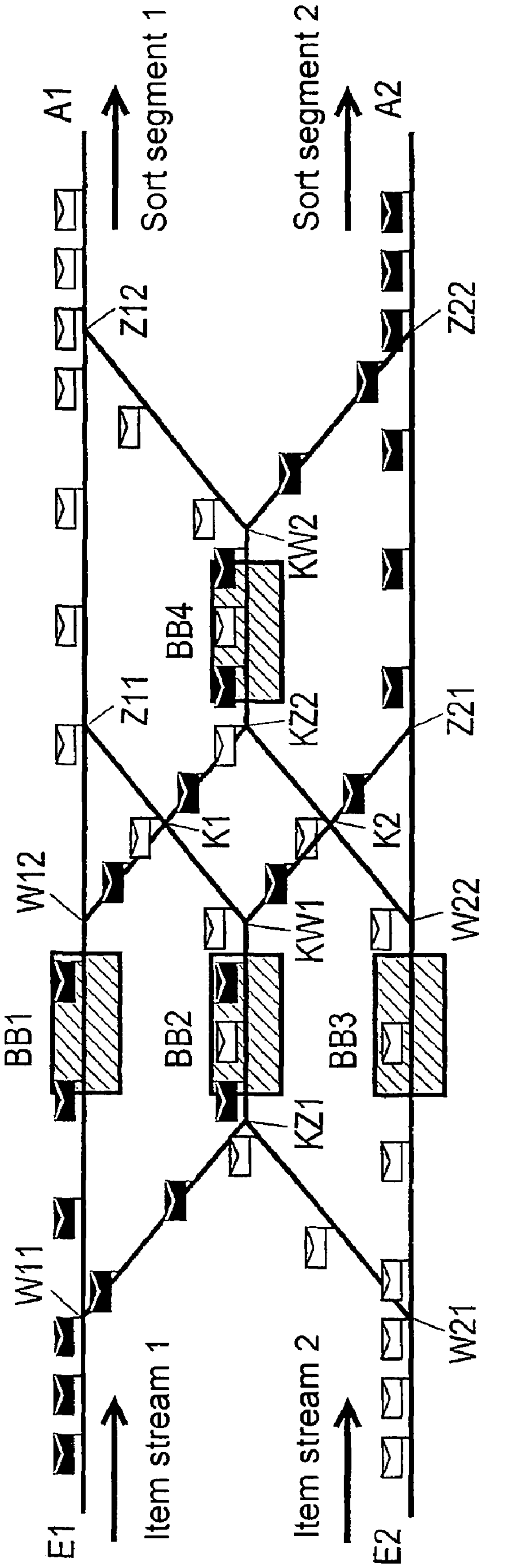

FIG. 2 shows a presorting device with two entries E1, E2 and two exits A1, A2 to provide improved clarity.

This device essentially corresponds to a part of the device shown in FIG. 1 (only two entries and exits E1, E2, A1, A2, and two connecting path structures described in FIG. 1). Since the second connecting path structure is displaced to shorten the length to the entries by comparison with the structures shown in FIG. 1, i.e. the switches W12, W22 of the second connecting path structure are located in the direction of transport before the intersections Z11, Z21 of the first connecting path structure, the connecting paths leading from the intersection areas KZ1-KW1 and KZ2-KW2 to the junctions Z11, Z21 or to the switches W12, W22 intersect additionally in the additional intersections K1, K2. The postal items shown are intended to illustrate that the black postal items are to be routed from entry E1 to exit A2 and the white postal items from E2 to exit A1. At the frontmost switches W11 and W21 each second postal item is directed to the intersection areas KZ1-KW1, KZ2-KW2, which means that in the two paths leading on from the switches W11, W21 streams of postal items are transported with large gaps between the postal items.

The same then also applies for the paths leading from the rear switches W12, W22 to intersection area KZ2-KW2 and to the paths leading away from the intersection areas KZ1-KW1, KZ2-KW2. If the two postal item streams are synchronized to each other at entries E1, E2, the postal items directed into the intersecting paths are offset from each other by one postal item and the gaps of the front edges and rear edges of the postal items to each other in the postal item streams at the entries E1, E2 correspond to at least the length of the longest postal item plus the minimum gaps functionally necessary for distribution, with the same lengths of the corresponding paths and symmetrical circumstances it is guaranteed for the connecting path structures that the postal items of the other stream in each case will move into the gaps arising, so that presorting runs without any conflicts.

Since however the average length of the postal item is smaller than the maximum item length, the above solution leads to throughput losses. To reduce these throughput losses with smaller gaps between the postal items, braking and acceleration modules BB1-BB4 are arranged before the possible collision points in the connecting paths, which displace a postal item in each case in relation to the adjacent items of the respective item stream so that the gap necessary for the respective intersecting postal item is created. To avoid collisions at the first intersection junction KZ1 the material entries creating the postal item streams at the entries E1, E2 are controlled accordingly.

Figure 4:
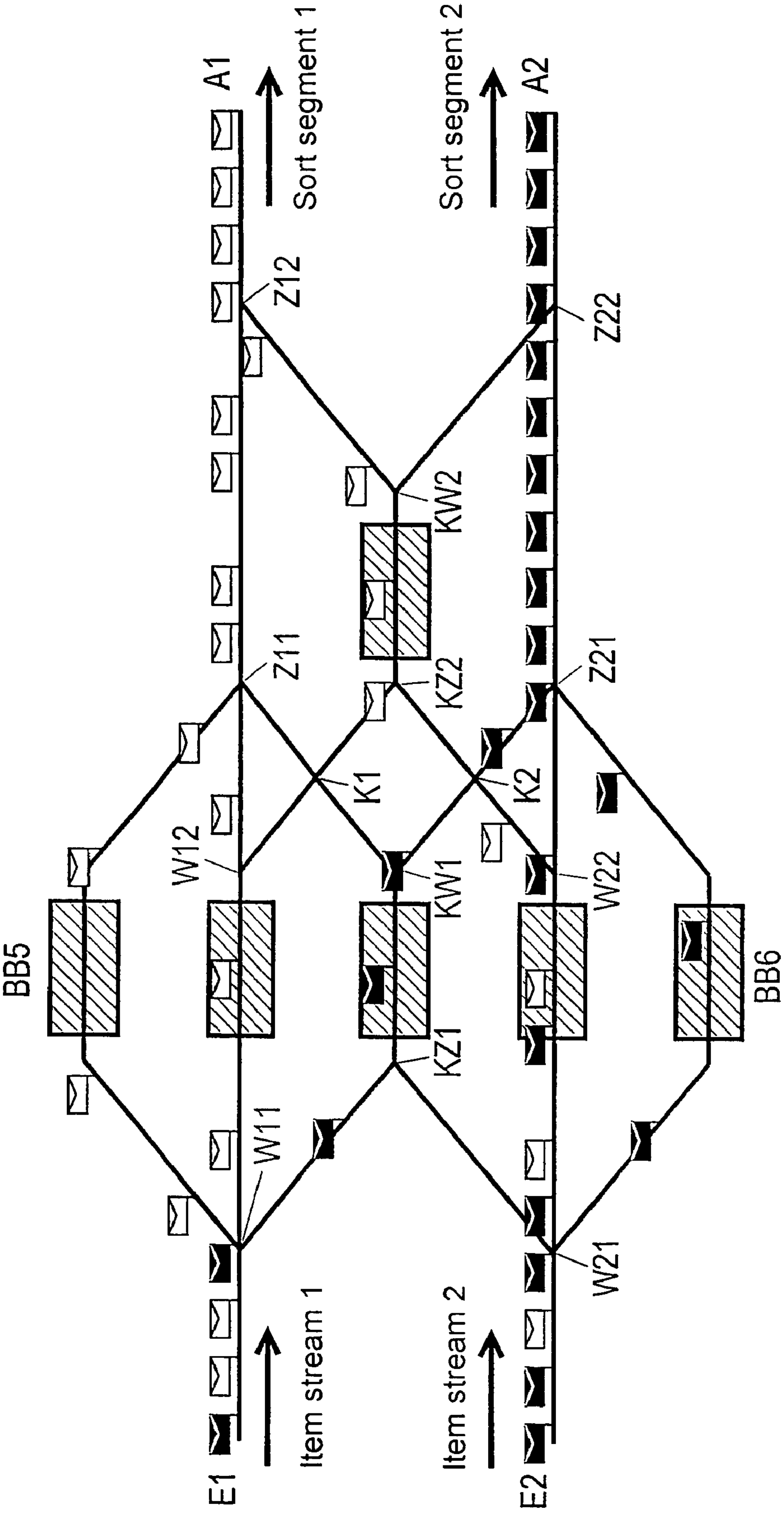

The braking and acceleration modules are located before the switches W12, KW1, W22 and thus ensure that there are suitable gaps in the intersections K1, K2 and in the junctions Z11, Z21, KZ2. Furthermore a fourth braking and acceleration module BB4 is located before switch KW2 of the intersection area KZ2-KW2, which creates the necessary gaps for the junctions Z12, Z22. The structure with the intersection areas KZ1-KW1, KZ2-KW2 has been selected in order to obtain the necessary space for the braking and acceleration modules BB2 and BB4 before the junctions Z11, Z21 and Z12, Z22. If two postal items must be directed almost at the same time from the two postal item streams at the entries E1, E2 to an exit A1 or A2, a correspondingly large gap must be created for the additional postal item to be inserted in the postal item stream leading to this exit. This can be achieved, in accordance with FIG. 4, by connecting a braking and acceleration module BB5 in parallel to braking and acceleration module BB1 via the switch W11 and the junction Z11 and by connecting a braking and acceleration module BB6 in parallel to braking and acceleration module BB3 via the switch W21 and the junction Z21. These switches and junctions thus divide the stream into three directions or join it from three directions. This means that, together with the remaining braking and acceleration modules BB1-BB4, there are sufficient controlled storage locations to partly eliminate the statistically unequal distributions.

Figure 5:
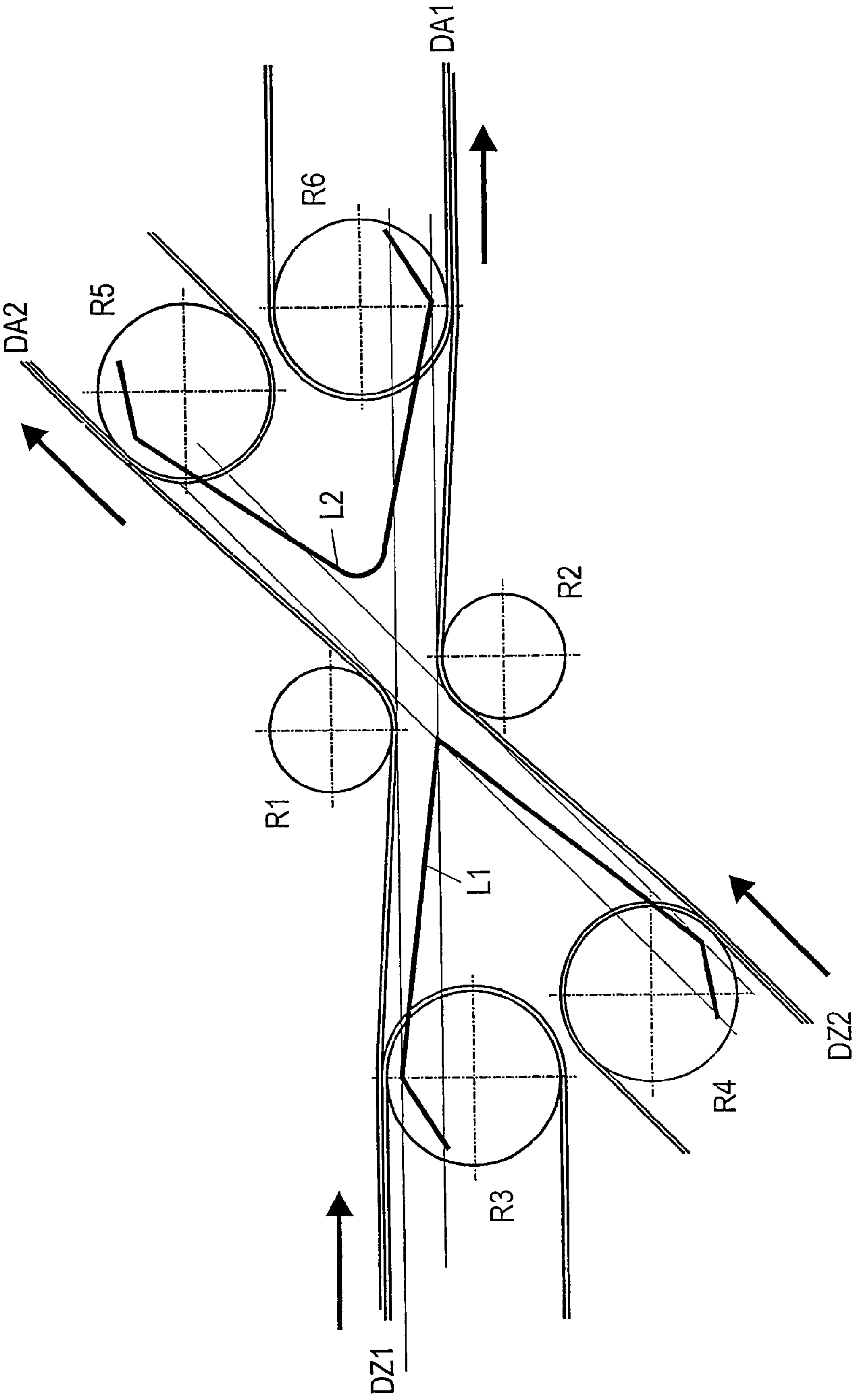

FIG. 5 shows a typical intersection K1, K2 in greater detail. The transport paths are formed in the known way by covered belt systems. In this system the outer covered belts of the two feeding covered belt systems DZ1, DZ2 are diverted in each case via a deflection roller R1, R2 and then run on at the exit of the intersection as the outer covered belt of the outgoing covered belt system DA1, DA2 of the respective intersecting path. The other covered belts of the incoming and outgoing covered belt systems DZ1, DZ2, DA1, DA2 are deflected to the entries and exits of the intersection via further deflection rollers R3-R6. Two corresponding guide elements L1, L2 are arranged to guide the postal items in the crossing, which guide the postal items over the intersection from the incoming into the outgoing covered belt system.

It should be stressed that these examples do not represent any restriction. Presorters with a greater number of entries and exits can naturally also be implemented with the inventive teaching, in which case the number of entries and exits do not have to match.

The invention claimed is:

1. A device for presorting separated thin postal items, of which distribution information has been successfully read, to sorting final position areas of a postal item sorting machine featuring consecutively arranged sorting final positions in accordance with the read distribution information and an assigned sorting final position area, comprising:

a number of inputs for streams of postal items and a number of outputs each leading to a sorting final position area;

connecting paths connecting the inputs to the outputs;

the connecting paths having a defined topology made up of switches, junctions and intersections;

at least two of the inputs being each connected by a direct connecting path to an output downstream from the respective input and an input being connected in each case via at least two further connecting paths to at least one output which is arranged downstream of another input;

the further connecting paths each featuring a section which branches off from the direct connecting path assigned to the respective input to a switch and which joins the direct connecting path assigned to the respective output at a junction;

each of these sections, which leads from the one direct connecting path to the other direct connecting path, featuring at least one intersection with at least one section leading from the other direct connecting path to the one direct connecting path, the intersecting sections intersecting one another in the same plane; and the postal items being distributed via the corresponding switches onto the intersecting sections of the further connecting paths so that at the intersections and in the junctions gaps are produced for avoiding collisions between postal items.

2. The device as claimed claim 1, wherein the number of intersecting sections corresponds to the at least the greater of the number of the inputs or the number of the outputs.

3. The device as claimed in claim 1, wherein two inputs and two outputs exist, with each input being connected by a direct connecting path, which runs via two switches arranged one after the other and two junctions arranged one after the other to the downstream output, each input being connected by means of two further connecting paths to the output downstream from the other input, the two further connecting paths assigned to a direct connecting path each running via one of the two switches and via one of the two junctions arranged in the other direct connecting path, each of the further connecting paths assigned to this input intersecting with a further connecting path assigned to the input at one of the intersections, and the postal items to be directed from one input to the direct connecting path connecting the other input to the downstream output in each case, for creating the gaps, being directed via the two switches arranged one after the other in turn to the two following further connecting paths arranged one after the other.

4. The device as claimed in claim 3, wherein the gaps between front edges and rear edges of the postal items correspond to at least a length of a longest postal item plus minimum gaps, and a chronological sequence of the postal items in the postal item streams and transport lengths are selected so that the postal items from the two inputs pass the intersections without obstructing each other.

5. A device for presorting separated thin postal items, of which distribution information has been successfully read, to sorting final position areas of a postal item sorting machine featuring consecutively arranged sorting final positions in accordance with the read distribution information and an assigned sorting final position area, comprising:

a number of inputs for streams of postal items and a number of outputs each leading to a sorting final position area;

connecting paths connecting the inputs to the outputs;

the connecting paths having a defined topology made up of switches, junctions and intersections;

at least two of the inputs being each connected by a direct connecting path to an output downstream from the respective input and an input being connected in each case via at least two further connecting paths to at least one output which is arranged downstream of another input;

the further connecting paths each featuring a section which branches off from the direct connecting path assigned to the respective input to a switch and which joins the direct connecting path assigned to the respective output at a junction;

each of these sections, which leads from the one direct connecting path to the other direct connecting path, featuring at least one intersection with at least one section leading from the other direct connecting path to the one direct connecting path;

the postal items being distributed via the corresponding switches onto the intersecting sections of the further connecting paths so that at the intersections and in the junctions gaps are produced for avoiding collisions between postal items;

for implementing the intersections, first sections of the intersecting further connecting paths from switches coming into the direct connecting path each open out into an intersection junction;

a braking and acceleration module for controlled displacement of postal items in the item stream or for temporary storage of the postal items is arranged in a common link following one of the intersection junctions; and an intersection switch is located at an end of the common link in each case for distributing the postal items on the second sections of the intersecting further connecting paths downstream from the intersections.

6. The device as claimed in claim 3, wherein in each direct connecting path seen in a direction of transport, the second switch arranged within it is arranged before the first junctions arranged in said path, so that the second sections of the further connecting paths seen in the direction of transport branching off at the first position from the direct connecting path additionally intersect with the sections of the further connecting path branching off at the second position viewed in the direction of transport from the other direct connecting path in two further intersections, and in each direct connecting path between the two switches arranged in it a further braking and acceleration module is arranged for collision-free merging and intersecting of the postal item streams.

7. The device as claimed in claim 1, wherein each direct connecting path features one or more parallel part sections each with a braking and acceleration module for temporary storage of postal items for the case in which the respective postal item is to be directed at the same time as a postal item of another entry into the same exit, and the buffered postal item is forwarded as soon as the relevant direct connecting path to this exit allows this to occur without collisions.

* * * * *